(12) United States Patent
VanMeter

(10) Patent No.: US 8,956,096 B2
(45) Date of Patent: Feb. 17, 2015

(54) STATIONARY SELF-DRAINING FASTENING POST WITH VIBRATION-FREE FRAME ATTACHMENT FOR TRAFFIC-RATED UTILITY VAULT COVER

(71) Applicant: Vault Access Solutions & Fabrications, Reno, NV (US)

(72) Inventor: Rick VanMeter, Wheatland, CA (US)

(73) Assignee: Vault Access Solutions & Fabrications, Reno, NV (US)

( * ) Notice: Subject to any disclaimer, the term of this patent is extended or adjusted under 35 U.S.C. 154(b) by 0 days.

(21) Appl. No.: 13/858,195

(22) Filed: Apr. 8, 2013

(65) Prior Publication Data
US 2014/0301805 A1    Oct. 9, 2014

(51) Int. Cl.
F16B 37/00    (2006.01)
E02D 29/14    (2006.01)
F16B 37/06    (2006.01)

(52) U.S. Cl.
CPC ............ *E02D 29/1427* (2013.01); *F16B 37/00* (2013.01); *F16B 37/061* (2013.01)
USPC .......................................... 411/171; 411/429

(58) Field of Classification Search
CPC ................................ F16B 37/061; F16B 37/14
USPC .......................................... 411/171, 427, 429
See application file for complete search history.

(56) References Cited

U.S. PATENT DOCUMENTS

| | | | | |
|---|---|---|---|---|
| 3,460,721 | A * | 8/1969 | Hamel et al. | 222/402.18 |
| 4,005,629 | A * | 2/1977 | Franklin | 403/49 |
| 4,600,332 | A * | 7/1986 | Sharp et al. | 403/179 |
| 5,273,384 | A * | 12/1993 | Dunbar | 411/428 |
| 5,820,323 | A * | 10/1998 | Barandun | 411/171 |
| 6,328,499 | B1 * | 12/2001 | Reding et al. | 403/299 |
| 6,417,449 | B1 * | 7/2002 | Perez-Bonifacini | 174/58 |
| 8,109,704 | B2 * | 2/2012 | Lewis et al. | 411/111 |
| 2008/0175690 | A1 * | 7/2008 | Kitano | 411/517 |

* cited by examiner

*Primary Examiner* — Flemming Saether
(74) *Attorney, Agent, or Firm* — Craig A. Simmermon

(57) ABSTRACT

A fastening post for a traffic-rated utility vault cover comprising an oblong mass with a tapped hole on its upper surface and a drainage port in its side surface where the upper end of tapped hole intersects with the lower end of drainage port in the interior of the oblong mass to form a smooth junction between these members. This design allows all debris falling into the tapped hole to slide down into the drainage port where it continues to fall and exit the oblong mass through the lower end of the drainage port. Fastening post has overall width that is at least three times that of the bolts or fasteners used to fasten down the hatch to the frame of the utility vault cover. Together with a specifically designed utility vault cover, fastening post provides a vibration-free reversible connection between the hatch and the frame of utility vault cover.

2 Claims, 4 Drawing Sheets

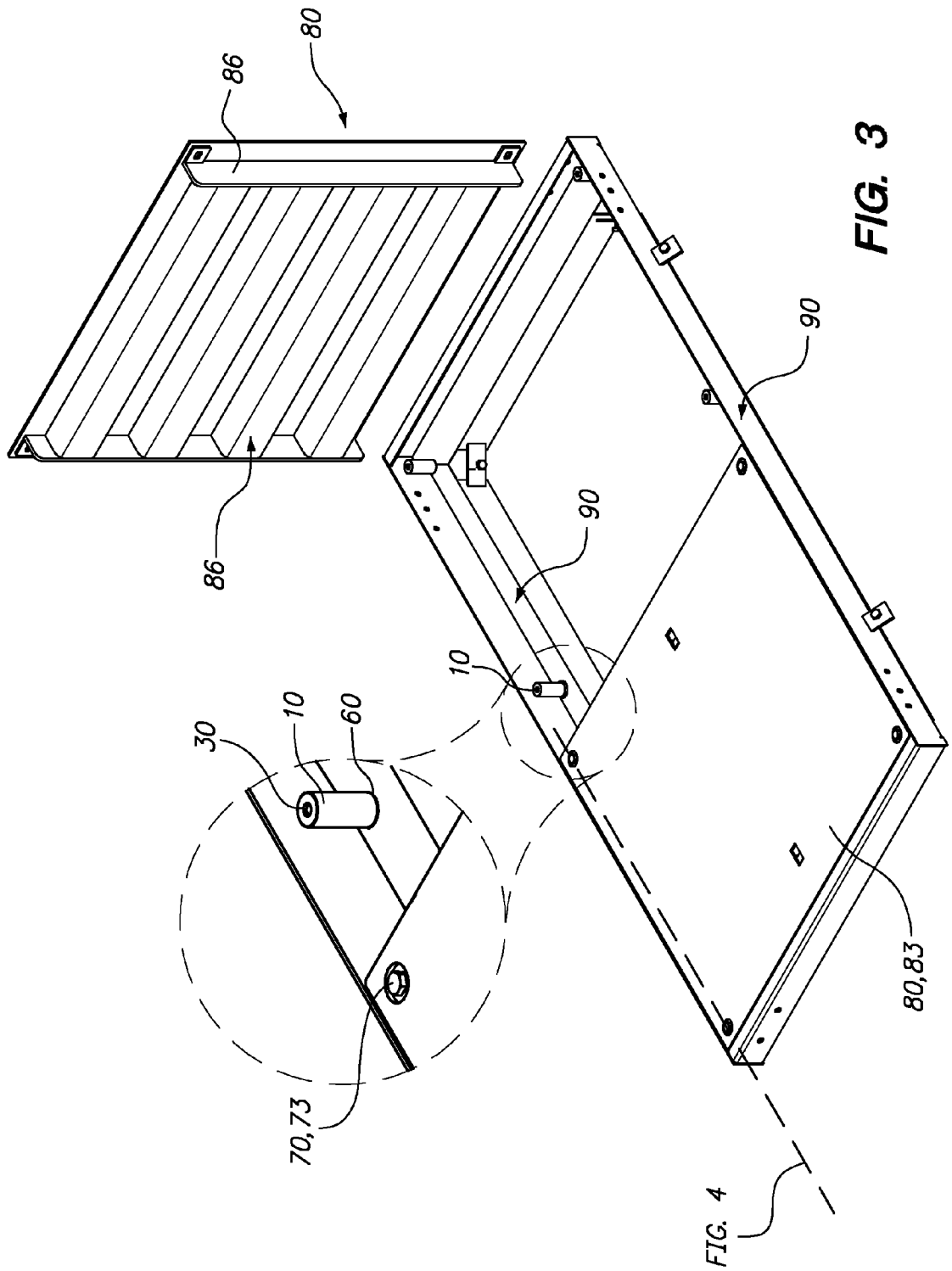

STATIONARY SELF-DRAINING FASTENING POST WITH VIBRATION-FREE FRAME ATTACHMENT FOR TRAFFIC-RATED UTILITY VAULT COVER

BACKGROUND OF THE INVENTION

1. Field of the Invention

This invention relates to traffic-rated covers for underground utility vaults and more specifically the structure used to bolt down and secure the hatch to the frame thereof, thereby holding the hatch closed on the frame with a semi-weather-tight connection with the frame and also holding the hatch stationary and stable as heavy vehicular and pedestrian traffic passes overtop.

2. Description of Related Art

A utility vault is an underground room providing access to subterranean public utility equipment, such as valves or other flow control devices for drinking water, drainage water, sewage, natural gas, or steam distribution networks, or switches, routers, or other electronic equipment for electric, telecommunications, television, or internet distribution networks. Utility vaults are similar to mechanical or electrical rooms in design and content. Utility vaults are located underground for aesthetic, safety, and security reasons. Typically, utility delivery networks include a series of main lines connected to branch lines that provide utility connections to individual houses and apartments. There could be a utility vault located at every junction between main lines and every junction between main line and branch line and at every junction between branch lines. Utility vaults are required with most sewer and drainage storage tanks, flow junctions, pump houses, and other areas of the sewage and drainage system of a village, municipality, town, city, or county. Thus, a typical utility distribution network or system includes a large number of utility vaults. Utility vaults are commonly constructed out of reinforced concrete boxes, poured cement, or brick. Utility vaults are typically entered through a manhole or vault cover on the upper surface or ceiling of the utility vault. Utility vault covers are used to prevent accidental and unauthorized access to a utility vault. Utility vault covers typically have latching and/or locking mechanisms to prevent unauthorized access to the utility vault.

A utility vault is typically a rectangular or square cuboid or box-shaped room. The utility vault cover is typically on the upper face of the cuboid. A utility vault cover is typically rectangle or square-shaped. A utility vault cover is pivotally attached at one end to the upper face of the cuboid. A utility vault cover is typically rotated upwards to open the cover and gain access to the utility vault and pivotally rotated downwards to close the cover and eliminate access to the utility vault.

A utility vault cover typically comprises a frame and a hatch. The frame is a closed-perimetered rigid assembly with an open center that is typically rectangular-shaped or square-shaped to fit the specific cuboid dimensions of the utility vault. The frame is attached to the utility vault on the upper face or at the upper edges of the vertical faces of the cuboid. The frame and utility vault are typically embedded into the ground with the upper surface of the frame generally flush with the upper surface of the ground of the surrounding area, which is typically earth, concrete, asphalt, or similar.

The hatch is a rigid planer member sized to fit and cover the upper face of the cuboid-shaped utility vault and to marry with the frame to make a semi-weather-tight connection with the frame. The hatch is typically square or rectangular shaped. One edge of the hatch is pivotally mounted on one leg of the frame so that the edge of the hatch opposite the pivotally mounted edge may be lifted upwards to open the hatch and pushed downwards to close the hatch.

Traffic-rated utility vault covers must be sturdy enough to support the continuous flow vehicular traffic and/or pedestrian traffic passing overtop without losing structural integrity, deflecting, bending, vibrating, or moving in any way. A traffic-rated utility vault cover must be of a very heavy-duty design to support the enormous amounts of weight and large volumes of people, cars, and trucks passing over the utility vault. In addition, the cover must form a semi-weather-tight connection with the frame to help keep the interior of the utility vault dry and safe from sun, wind, rain, ice, snow, insects, rodents, and the like. To accomplish this, a latching mechanism or closing mechanism is required to securely hold down the hatch and to form a semi-weather-tight connection with the frame while also supporting the enormous amounts of weight and stress from the hatch and the traffic passing over it.

For safety reasons, a closed, latched, and/or locked hatch should not open, shift, deflect, deform, bend, vibrate, or move in any way because this would pose a very serious safety problem to people and vehicles attempting to pass over the utility vault as they could fall in the utility vault or otherwise hurt themselves or damage their property if the hatch is jostled while they pass overtop. Further, even small vibrations of the hatch or its latching and/or locking mechanisms over extended periods can lead to latch and/or lock failure causing the same safety issues. Small vibrations between the hatch and frame of a utility vault cover can cause the hatch to open, shift, deflect, deform, bend, vibrate, or move.

To remedy this, applicant has devised a heavy-duty stationary self-draining fastening post with vibration-free frame attachment that together with a bolt or other fastener will securely hold down the hatch to the frame to yield a strong, rigid, vibration-free connection between these members that is capable of supporting enormous amounts of weight without losing structural integrity, deflecting, bending, vibrating, or moving in any way.

In the prior art, there are a few mechanisms or systems designed to hold down and secure manhole covers located on streets or sidewalks or other traffic areas. Most prior art mechanisms secure the manhole cover with a plurality of bolt members or threaded stud members, each passing through a clearance hole in the manhole cover and threaded into a floating nut member or similar floating tapped hole member on the other side. The nut member is "floating" because it must be able to track along the bolt member as the bolt member is rotated to loosen or tighten the connection. Typically, floating nut members are secured to the frame-side to provide crews access to the heads of the bolt members on the topside of the manhole cover. When a bolt member is tightened, the floating nut member tracks along the bolt member until it is limited by its frame-side attachment to start to squeeze the manhole cover between the bolt member head and the floating washer member. Tightening the bolt beyond the limit point pushes the manhole cover down to clamp onto the frame of the structure. The bolt members pull down on the manhole cover to hold the manhole cover down onto the frame, which is stationary in the ground. Most prior art mechanisms secure manhole covers using the floating nut member design.

The floating nut member design is inferior because nut members are floating or moving members, which prompts a smaller, less robust design. Nut members must track up and down to a certain extent relative to bolt members as the bolt members are turned by utility crews to open or close the hatch. This design leads to a less robust nut member design because nut members must be sized smaller than the bolt members so that nut members can track along the bolt members. This leads to a smaller amount of threads on the bolt member actually engaged with and in physical contact with female threads on the nut member. Less thread contact between these members means a less clamping pressure exerted to hold the hatch down onto the frame. Less clamping pressure here means a less sturdy design that is more prone to deflecting, bending, vibrating, or moving from heavy traffic passing overtop.

Also, the floating nature itself of the floating nut member is an inferior design because the floating nut moves. Floating nut member is not rigidly attached to the frame and is thereby much more susceptible to vibrations. A moving anchor point is less capable of holding a strong rigid vibration-free connection between the hatch and frame of a traffic-rated utility vault cover. The floating nut member design is less sturdy and allows more of a likelihood that the hatch would open, shift, move, deflect, bend, or vibrate from heavy traffic passing overtop.

This invention includes a massive stationary nut member design where the nut member is an oblong heavy mass with a deep tapped hole where at least one inch of thread in the tapped hole in the nut member engages and physically contacts threads on the bolt members to yield a much more robust design capable of delivering huge amounts of clamping pressure to securely hold down the hatch to the frame and support enormous amounts of weight passing overtop without bending, deflecting, vibrating, or moving in any way. Massive stationary nut members are attached to the frame with a strong, rigid, vibration-free connection including a closed-loop continuous singular full-perimeter weld around each nut member without any holes or structural voids in the frame near the vicinity of the weld. The design of this invention is a substantial improvement over all floating washer member designs.

A drawback to the massive stationary nut member design is that the tapped hole of the nut member is susceptible to debris build-up because the tapped hole stands upright and massive stationary nut member cannot be easily moved or removed for cleaning. Further, once the tapped-hole of the nut member is clogged with debris, it is practically impossible to completely clean out because flushing the upright blind hole does not completely remove all debris. This is a problem because a large amount of debris can build-up in the tapped hole causing back pressure on the bolt member to prevent the proper clamping pressure on the hatch. To remedy this, this invention includes a novel method of preventing debris build-up in the heavy-duty stationary self-draining fastening post with the use of a special drainage port.

BRIEF SUMMARY OF THE INVENTION

Stationary self-draining fastening post with vibration-free frame attachment is an oblong mass of rigid metal material with a height of at least one inch, an overall width dimension that is at least three times the outer diameter of the threaded member used to fasten down the hatch to the frame, and a tapped hole at least one inch deep in its upper surface sized to accept the threaded member used to fasten down the hatch to the frame. The specific longitudinal cross-section of self-draining fastening post with vibration-free frame attachment is not important.

Stationary self-draining fastening post with vibration-free frame attachment is rigidly attached to the base frame of the utility vault cover with one closed-loop continuous full-perimeter weld around the fastening post where the base frame remains integral without any holes or voids in the frame's structure near the weld.

Stationary self-draining fastening post with vibration-free frame attachment includes a debris drainage port and flow channel strategically sized, shaped, and located within the heavy-duty fastening post to allow all debris falling into the tapped hole to drain out or fall out through the debris drainage hole from the force of gravity.

BRIEF DESCRIPTION OF THE DRAWINGS

FIG. 3 is a depiction of utility vault cover with four stationary self-draining fastening posts with vibration-free frame attachment installed onto the frame of the utility vault cover which also defines the cross sectional plane of FIG. 4.

Figure 1:
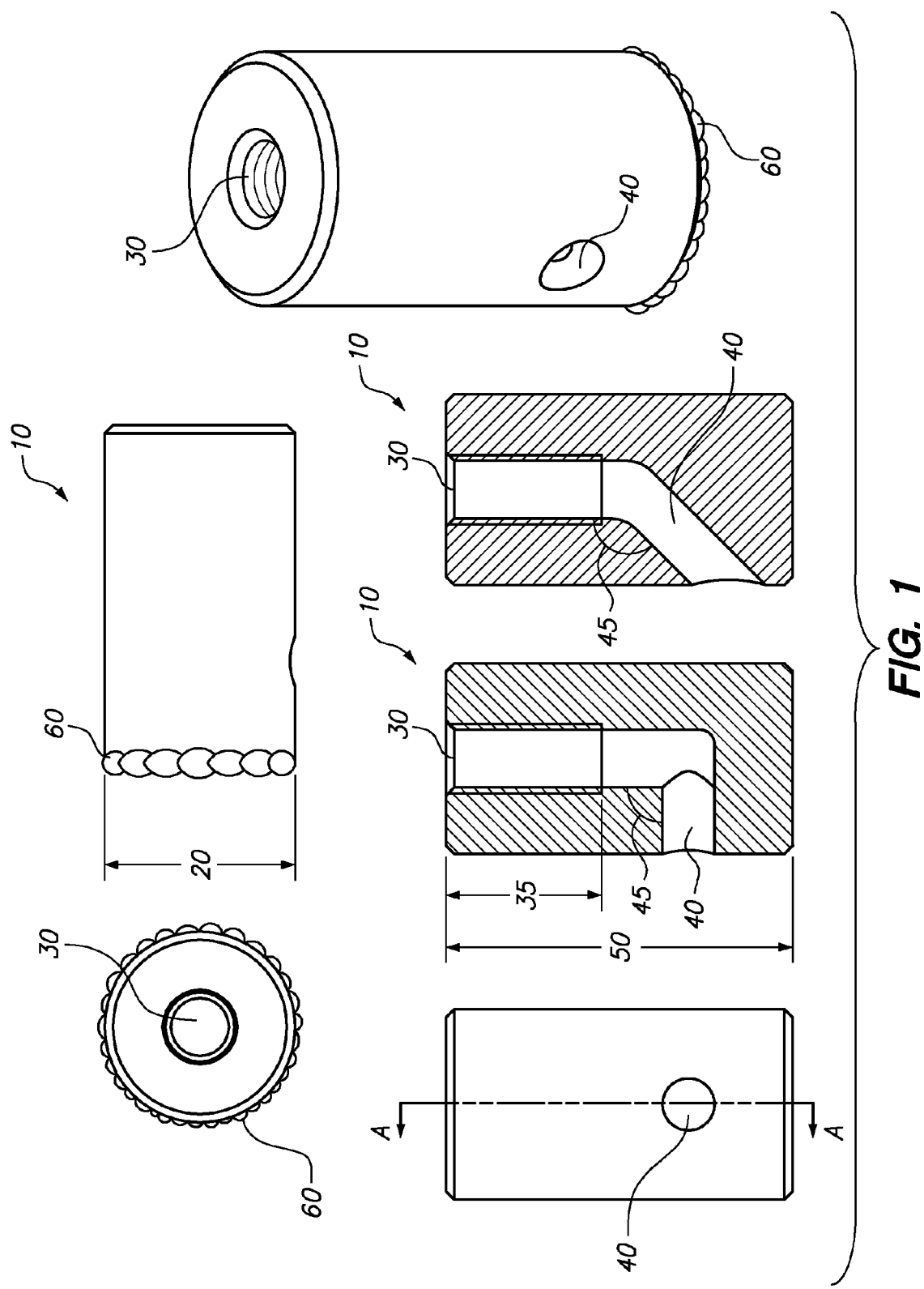
FIG. 1, going from left to right and top to bottom, is a top perspective view, side elevation view, another side elevation view defining the cross sectional plane, two cross sectional views of different modes, and a perspective view of stationary self-draining fastening post with vibration-free frame attachment.

| \ | DEFINITION LIST |
| --- | --- |
| Term | Definition |
| 10 | Stationary Self-Draining Fastening Post With Vibration-Free Frame Attachment |
| 20 | Overall Width Dimension |
| 30 | Tapped Hole |
| 35 | Thread Depth |
| 40 | Drainage Port |
| 45 | Drainage Port Angle |
| 50 | Height |
| 60 | Full-Perimeter Singular Closed-Loop Weld |
| 70 | Bolt or Threaded Fastener |
| 73 | Bolt Head |
| 76 | Bolt Threads |
| 80 | Hatch |
| 83 | Upper Surface of Hatch |
| 86 | Hatch Support Frame |
| 90 | Base Frame of Utility Vault Cover |

DETAILED DESCRIPTION OF THE INVENTION

A utility vault is typically a rectangular or square cuboid or box-shaped room. The utility vault cover is typically the upper face of the cuboid or placed onto the upper face of the cuboid. A utility vault cover is typically rectangle-shaped or square-shaped. A utility vault cover may have a hatch pivotally attached at one of its ends to the upper edge of one of the cuboid's vertical faces or to the upper face of the cuboid. Alternately, a utility vault cover may have a "drag-off" hatch without pivotal attachment to the cuboid. The hatch of a utility vault cover is typically rotated upward or removed completely to open the cover and gain access to the utility vault. This invention pertains to both pivotally attached and removable drag-off utility vault cover designs because both utilize fastening posts to secure a hatch onto a frame of a utility vault cover.

A traffic-rated utility vault cover comprises: a hatch 80 and a base frame 90. Base frame 90 is a closed-perimetered rigid planer framework assembly with an open center that is typically rectangular-shaped or square-shaped to fit the specific cuboid dimensions of the utility vault. Base frame 90 is attached to the utility vault at the upper edges of the vertical faces of the cuboid or to the upper face of the cuboid and is positioned horizontally. Base frame 90 and utility vault are typically embedded into the ground with the upper surface of the base frame 90 generally flush with the upper surface of the ground of the surrounding area, which is typically earth, concrete, asphalt, or similar. The open center of base frame 90 is used for human ingress and egress to the utility vault. Hatch 80 covers the open center of base frame 90 to close access to the utility vault.

Hatch 80 comprises a support frame 86 and an upper surface 83. Support frame 86 is a series of oblong rigid members rigidly connected to each other to form a heavy-duty rigid planer support lattice that is capable of supporting at least 20 tons on its plane while horizontal without losing structural integrity, deflecting, or bending. Support frame 86 is sized slightly smaller than the open center of base frame 90 and is designed to nest just inside the open center of base frame 90 when hatch 80 is closed.

Upper surface 83 is a solid rigid planer member sized to be just slightly smaller than the open center of base frame 90 to from a semi-weather-tight connection with base frame 90 when hatch 80 is closed. Upper surface 83 is placed concentrically on top of support frame 86 and rigidly connected to support frame 86 form a solid rigid assembly that is hatch 80. With this design, upper surface 83 is capable of supporting at least 20 tons without losing structural integrity, deflecting, bending, vibrating, or moving.

As stated, a closed, latched, and/or locked hatch 80 should not open, shift, deflect, deform, bend, vibrate, or move in any way because this would pose a very serious safety problem. The way hatch 80 fits onto base frame 90 and is latched and/or locked onto base frame 90 is critical to this safety issue. When closed and latched and/or locked, hatch 80 must have a rigid compression connection with base frame 90 capable of supporting at least 20 tons of bouncing weight on upper surface 83 without losing structural integrity, deflecting, bending, vibrating, or moving. Even small vibrations at this connection can lead to structural failures and/or movement of the hatch.

Figure 4:
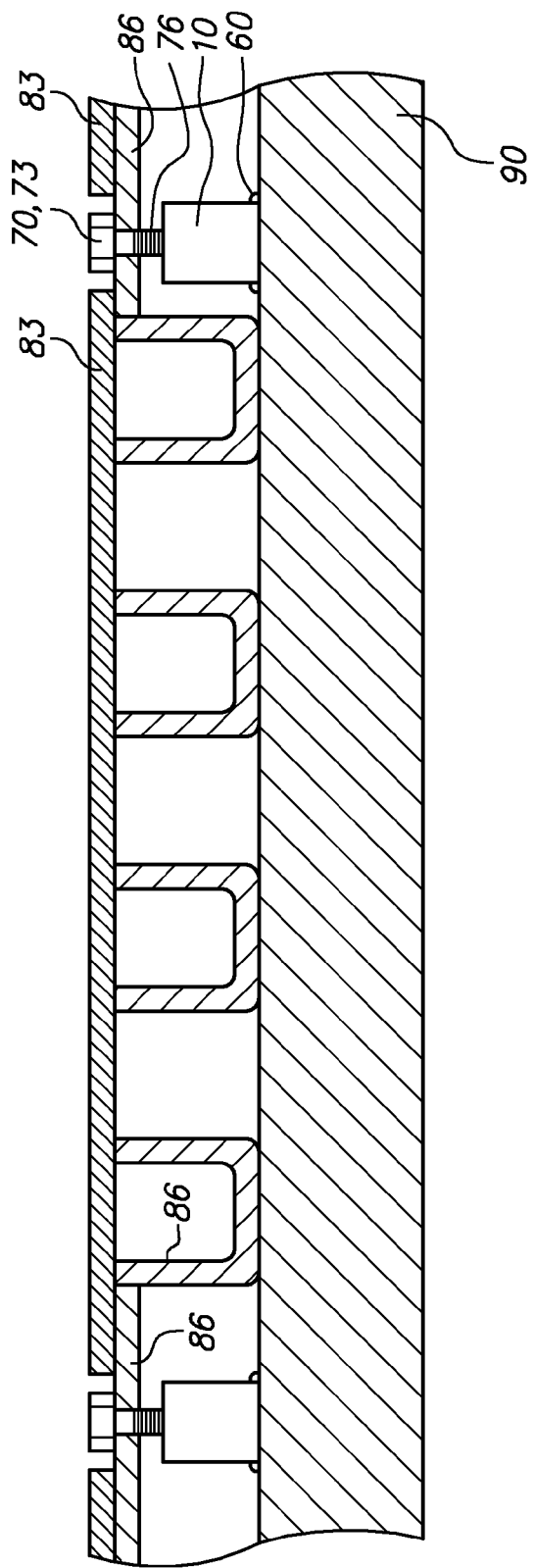
FIG. 4 is a cross-sectional view depicting how bolts 70, with stationary self-draining fastening posts with vibration-free frame attachment 10, pair to create a large volume of clamping pressure between the support frame of the hatch 86 and the base frame of the utility vault cover 90 which yields the vibration-free attachment between these members.

To eliminate vibrations, hatch support frame 86 is clamped down onto base frame 90 of the utility vault cover to compress these members with a large degree of compression force. This is the key to vibration-free attachment between these members. When bolts 70 are tightened into fastening posts 10, bolt heads 73 exerts clamping pressure on support frame 83 to push support frame 83 down onto base frame 90, which is stationary, yielding large clamping pressure between these members. See FIG. 4 for a depiction of this design. With this design, all appreciable vibrations between these members are eliminated with up to 20 tons of traffic is passing by overtop thereby exerting an enormous amount of upwards and downwards forces on the connections between these members.

Typically, one bolt/fastening post pair is located at each corner of hatch 80, making a total of four bolt/fastening post pairs per hatch 80. See FIG. 4 for a depiction of this. Alternately, additional bolt/fastening post pairs may be located along the edges of hatch 80. As bolts 70 are tightened, clamping pressure increases between frames 86 and 90. Clamping pressure is limited by the structural integrity of fastening posts 10 and bolts 70.

In the prior art, floating nut members (not depicted) are the weak link in the clamping mechanism and thus are the first to fail upon over exuberant tightening of bolts 70 to yield the required clamping pressure to eliminate vibrations. This invention incorporates a stationary self-draining fastening post with vibration-free frame attachment 10 that, when combined with heavy-duty bolts 70, yield enormous clamping pressure between frames 86 and 90 to eliminate all appreciable vibrations between these members, even with 20 tons of traffic is passing overtop at a medium rate of speed.

Figure 2C:
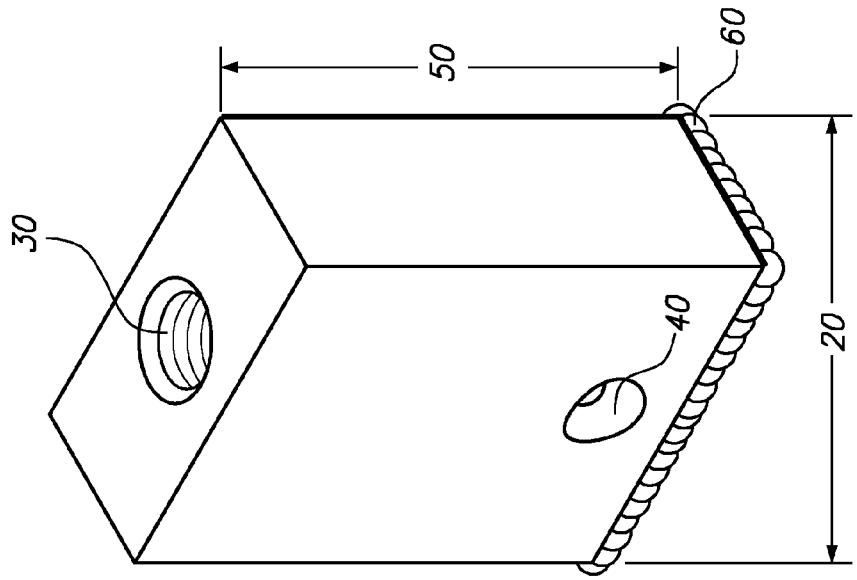
FIGS. 2A, 2B, and 2C are perspective views of stationary self-draining fastening post with vibration-free frame attachment with a triangular, square, and rectangular shaped longitudinal cross-section running uniformly down its longitudinal axis, respectively.
Figure 2B:
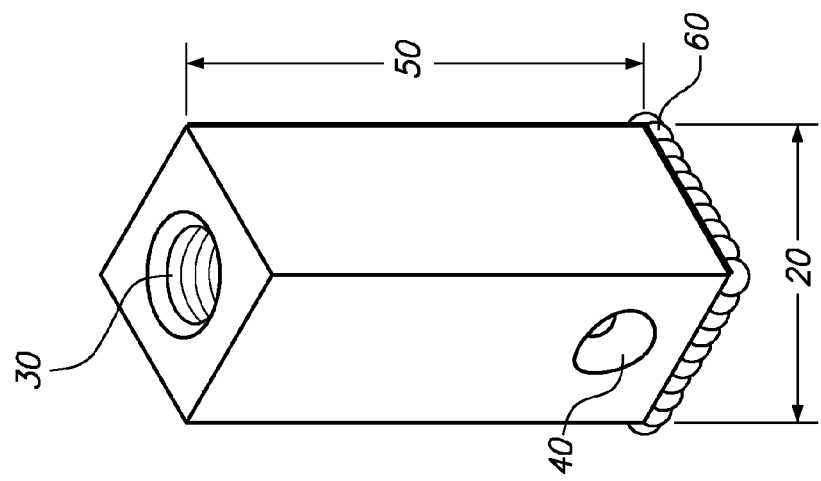
Figure 2A:
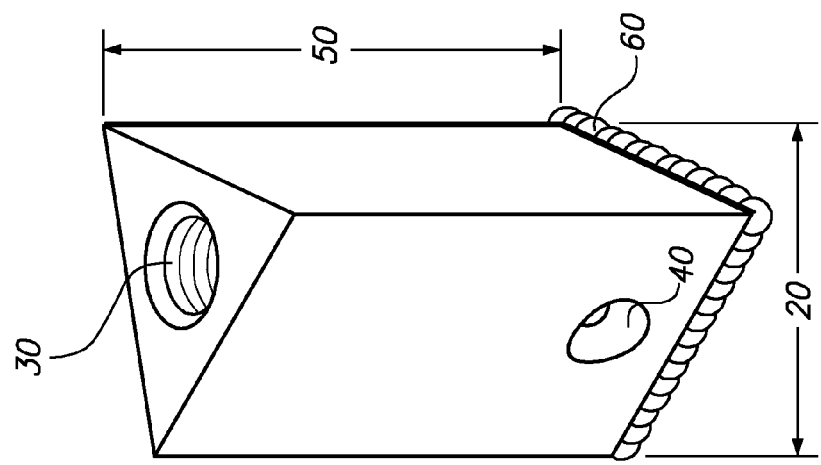

Stationary self-draining fastening post with vibration-free frame attachment 10 comprises an oblong mass of metal material with high tensile strength with a lower end, an upper end, a side, a height 50 of at least one inch, an overall width dimension 20 that is at least three times the outer diameter of the threaded member or bolt 70 used to fasten down hatch 80 to base frame 90, and a tapped hole 30 in the upper end running along the longitudinal axis of the oblong mass. As long as the overall width dimension 20 is at least three times the outer diameter of the threaded member or bolt 70 used to fasten down hatch 80 to base frame 90, the specific longitudinal cross-section of self-draining fastening post with vibration-free frame attachment is not important. In best mode, stationary self-draining fastening post with vibration-free frame attachment 10 has a circular longitudinal cross-section running uniformly down its longitudinal axis because this shape is less costly to manufacture. However any shape may be used. Stationary self-draining fastening post with vibration-free frame attachment 10 could have a triangular, square, or rectangular shaped longitudinal cross-section running uniformly down its longitudinal axis as depicted in FIGS. 2A, 2B, and 2C respectively.

Tapped hole 30 is a cylindrical hole with an inner diameter and female thread on the inner diameter sized to accept bolt 70. Tapped hole 30 must have threads of at least one inch in depth to yield enough clamping pressure to prevent vibrations. Threads are located at the top of tapped hole 30 and typically do not extend the full length of taped hole 30. Where threads have discontinued in tapped hole 30, tapped hole 30 has a completely smooth inner surface to yield a smooth flow channel that is without catch areas or snag areas for debris draining through tapped hole 30 to catch or cling onto.

Stationary self-draining fastening post with vibration-free frame attachment 10 is rigidly attached to the base frame 90 of the utility vault cover in the vertical position at its lower end, with tapped hole 30 pointing upwards. Rigid attachment is done with one closed-loop continuous full-perimeter weld 60 around the lower end of fastening post 10, where base frame 90 remains integral without any holes or voids in the frame's structure at the weld area or in the vicinity of the weld area within at least two inches of the weld area.

The stationary nature of stationary self-draining fastening post with vibration-free frame attachment 10 is beneficial to the vibration issue; however, it is a drawback for maintenance issues because the replacement of failed stationary self-draining fastening post with vibration-free frame attachment 10 requires welding and extensive work for crews. To remedy this, stationary self-draining fastening post with vibration-free frame attachment 10 is designed with excess structural integrity compared that of bolts 70, thereby causing any failures from over-tightening to first occur with bolts 70 and not fastening posts 10. This is accomplished by providing a metal fastening post with overall width dimension 20 that is at least three times the outer diameter of the threaded member or bolt 70 used to fasten down hatch 80 to base frame 90. With this design, failures may be repaired with new bolts 70, instead of conducting the complicated procedure involved with replacing fastening posts 10.

As stated above, another drawback to the stationary nature of stationary self-draining fastening post with vibration-free frame attachment 10 is that tapped hole 30 is susceptible to debris build-up because it is an open hole that stands directly upright. Once tapped-hole 30 is clogged with debris, it is practically impossible to completely clean it out. The flushing of an upright blind hole with air or water may not completely remove all debris from the hole because there is no lower exit point for the flush to occur. Heavy debris in the bottom of the hole simply remains there during the flush. Debris can build-up in tapped hole 30 and prevent bolt 70 from seating down to properly clamp hatch support frame 83 down to base frame 90 to properly secure hatch 80. As stated, a high-pressure compression connection is required between these members to yield the proper vibration-free connection between the hatch 80 and base frame 90.

To remedy this, stationary self-draining fastening post with vibration-free frame attachment 10 further comprises a debris drainage port 40. Debris drainage port 40 is a smooth circular flow channel with the same inner diameter as tapped hole 30 that seamlessly junctions, intersects, or joins with tapped hole 30. The inner flow channel of drainage port 40 is completely smooth without any catch areas to eliminate debris from clogging drainage port 40. The junction between flow channels 30 and 40 is completely smooth without any sharp seams or catch areas to prevent debris from clogging tapped hole 30 and drainage port 40. This allows for a smooth or seamless transition between tapped hole 30 and debris drainage port 40. A smooth transition is required to insure that debris will not get caught or hung-up at the transition between tapped hole 30 and debris drainage port 40.

Drainage port 40 may be placed horizontally to junction with tapped hole 30 at a right angle. This design allows for less costly manufacture but also allows for greater susceptibility to clogging because the right-angle connection unavoidably yields an edge at the junction that could cause debris to catch onto yielding a clog in flow channels 30 and 40.

In best mode, drainage port 40 is angled downward and is not horizontal to yield a intersect angle between tapped hole 30 and drained port 40 that is an obtuse angle. The angle of this junction is noted by item 45 on the drawings. In best mode, angle 45 is greater than 90 degrees but less than 180 degrees.

Tapped hole 30 may extent longitudinally through fastening post 10 to make a hole in the bottom of fastening post 10. This design allows for less costly manufacture but also allows for greater susceptibility to clogging because the bottom portion of tapped hole 30 is permanently blocked after attachment to base frame 90, creating a blind hole or dead-end flow channel. This could cause debris to fill up in the blocked hole to possibly cause interference with bolts 70. This occurs because there is no drainage flow channel below the drainage port junction.

In best mode, tapped hole 30 does not extend completely through the fastening post 10, but only extends partially through fastening post 10. Drainage port 40 then seamlessly joins with tapped hole 30 to yield a smooth connection between flow channels 30 and 40. The inner diameter of the flow channel at this junction remains constant and equivalent to that of flow channels 30 and 40, thus there is continuity of inner diameter flow channels through the junction.

Special machining and polishing of these internal flow channels must be taken to yield the smooth connection. With this design, it is nearly impossible for debris to catch or hang up in flow channels 30 and 40.

Also, drainage occurs naturally as a result of gravity because the tapped hole is positioned upright where gravity naturally causes debris to fall down to the bottom of tapped hole 30. From there, gravity continues to pull the debris into drainage port 40 where it continues to fall until it exits from the hole in the side of fastening post 10.

What is claimed:

1. A fastening post for a utility vault cover comprising: an oblong mass of metal material with a lower end; an upper end; a side; a height dimension; an overall width dimension; a tapped hole; a drainage port, and a frame attachment means, wherein, said tapped hole is a cylindrical hole with an upper end, a lower end, an inner diameter, and a set of female threads on said inner diameter sized to accept a male threaded member used to fasten down a hatch on a utility vault cover, said height dimension is 1-25 inches, said overall width dimension is 3-30 times that of said male threaded member, said tapped hole is located on said upper end of said oblong mass with its longitudinal axis coincident with that of said oblong mass, said drainage port is a cylindrical flow channel with an upper end, a lower end, and an inner diameter that matches that of said tapped hole, said lower end of said drainage port is located on said side of said oblong mass, said upper end of said drainage port junctions or intersects with said lower end of said tapped hole to create a smooth junction between said tapped hole and said drainage port located in the interior of said oblong mass, said tapped hole and said drainage port form a junction angle that is 90-180 degrees at said smooth junction, said frame attachment means functions to rigidly attach said fastening post to a base frame of said utility vault cover with the longitudinal axis of said oblong mass pointing directly upwards, and said frame attachment means is one closed-loop continuous full-perimeter weld around said lower end of said fastening post thereby welding said fastening post to said base frame of said utility vault cover.

2. A fastening post for a utility vault cover as recited in claim 1, wherein said oblong mass has a horizontal cross sectional shape that is circular, triangular, square, or rectangular.

* * * * *